United States Patent [19]

Harwood et al.

[11] Patent Number: 5,272,215
[45] Date of Patent: * Dec. 21, 1993

[54] MODIFIED PLASTIC ELASTOMER BLOCK COPOLYMERS

[75] Inventors: H. James Harwood, Stow; Allan S. Jones, Cuyahuga Falls, both of Ohio; Malcolm A. Smook, Wilmington, Del.

[73] Assignee: The West Company, Incorporated, Phoenixville, Pa.

[*] Notice: The portion of the term of this patent subsequent to May 5, 2009 has been disclaimed.

[21] Appl. No.: 639,916

[22] Filed: Jan. 10, 1991

Related U.S. Application Data

[63] Continuation-in-part of Ser. No. 562,468, Aug. 3, 1990, Pat. No. 5,110,876.

[51] Int. Cl.$^5$ ............................................. C08F 293/00
[52] U.S. Cl. ................................ 525/324; 525/333.3; 525/333.5; 525/346; 525/353; 525/359.3
[58] Field of Search .............. 525/332.3, 332.9, 333.3, 525/359.3, 324, 333.5, 346, 353

[56] References Cited

U.S. PATENT DOCUMENTS

| | | | |
|---|---|---|---|
| 2,500,082 | 10/1950 | Lieber et al. | 525/359.3 |
| 4,677,153 | 6/1987 | Kitahara et al. | 525/359.3 |
| 4,952,648 | 8/1990 | Yamaguchi et al. | 525/539 |
| 5,110,876 | 5/1992 | Harwood et al. | 525/332.3 |

*Primary Examiner*—Joseph L. Schofer
*Assistant Examiner*—R. H. Delmendo
*Attorney, Agent, or Firm*—Eugene E. Renz, Jr.

[57] ABSTRACT

A thermoplastic elastomeric block copolymer comprising olefin elastomeric mid block units and terminal polystyrene units having substitution in an amount sufficient to raise the glass transition temperature of the polymer. The substitution comprises cycloaliphatic or aromatic acylation and the acylation substitution is accomplished by reaction of an acylhalide with the copolymer in the presence of a catalytic amount of triflic acid.

2 Claims, No Drawings

5,272,215

MODIFIED PLASTIC ELASTOMER BLOCK COPOLYMERS

This is a continuation-in-part application of copending patent application, Ser. No. 07/562,468, filed Aug. 3, 1990, now U.S. Pat. No. 5,110,876 issued May 5, 1992.

FIELD OF THE INVENTION

The present invention relates to block copolymers having olefin elastomeric mid block units and terminal polystyrene units, and more particularly to such block copolymers with increased glass transition temperatures and other improved properties.

BACKGROUND OF THE INVENTION

Hydrogenated block copolymers such as polystyrenepoly(ethylene-co-butylene)-polystyrene (SEBS) block copolymers are important thermoplastic elastomers. Unfortunately, the utility at elevated temperatures of these materials is limited by the relatively low glass transition temperature (Tg) of the polystyrene end segments. Typical SEBS block copolymers lose most of their reinforcing ability above 60°-70° C., even though the Tg of the polystyrene segment is about 100° C.

It would be advantageous to increase the Tg of the end segments of SEBS block copolymers to make them more useful at elevated temperatures. Three methods have been proposed to modify SEBS block copolymers to enhance the elastomeric properties of the polymers at elevated temperatures.

In the first method, monomers other than styrene may be employed in the manufacture of ABA block copolymers. This would produce end segments with a higher Tg than that of polystyrene. Among these monomers are 4-tert-butylstyrene, alpha-methylstyrene, and chlorostyrene. Nevertheless, only styrene has gained commercial importance in the manufacture of end segments of ABA type block copolymers and this method has no commercial interest, in part due to process limitations.

Melt blending high Tg homopolymers with ABA block copolymers has also been used as a method to increase the elastomeric properties at elevated temperatures. The choice of these homopolymers is limited to those which are compatible with end segments and which are incompatible with the mid segment. Some improved properties have been noted at elevated temperatures, but concomitant decreases in other properties caused by the melt blend has prevented this method from major acceptance.

Finally, chemical modification of the end segments of the SEBS block copolymers is the third method which might be used to enhance the elastomeric properties of SEBS block copolymers at elevated temperatures. At the present time, no successful system has been proposed which accomplishes this goal.

Chemical reactions of SEBS copolymers may also cause undesired side reactions such as main chain scission or gelation. Since the mechanical properties of SEBS block copolymers change with molecular weight and molecular weight distribution, it would also be desirable to modify the SEBS copolymers without significantly altering the molecular weight and the molecular weight distribution of the compounds.

At the present time, all of these proposed methods have met with failure. Specifically, when polystyrene is replaced with poly(4-tert-butylstyrene) segments of an equivalent molecular weight, the strength to break this block copolymer will be lower, even though the replacement portion has a Tg of 134° C. compared to 100° C. for polystyrene. This difference in strength is believed to be due to increased compatibility with the mid block segments. Melt blending of course adds other properties of the added materials, and therefore, increases in Tg results are sometimes offset by decreases in other properties. Otherwise, the high Tg homopolymer would be used alone.

U.S. Pat. No. 4,868,245, Pottick et al, acknowledges that materials such as SEBS have poor high temperature strength, particularly above the Tg of 100° C. Pottick et al focuses on increasing the Tg of the arene A block. Another attempt is shown in U.S. Pat. No. 4,946,899, Kennedy et al, by direct reaction during polymerization.

At the present time, no olefin based thermoplastic elastomer has been chemically modified to withstand the higher temperatures for extended periods. This is desirable, particularly if the polymers would be useful above at least 100°. Otherwise, the materials are not able to be employed in medical applications where sterilization is important. Automotive and adhesive applications where strength at high temperatures is important are also not possible.

It is therefore an object of this invention to provide SEBS block copolymers which are useful above 100° C.

SUMMARY OF THE INVENTION

It has now been discovered that the above objects of the present invention may be accomplished in the following manner.

Specifically, the invention comprises a thermoplastic elastomeric block copolymer. The copolymer includes olefin elastomeric mid block units and terminal polystyrene units having modification in an amount sufficient to raise the glass transition temperature of the copolymer. The modification may be cycloaliphatic or aromatic acylation.

In a preferred embodiment, the modification of the terminal polystyrene units of the thermoplastic elastomeric block copolymer of the present invention may be accomplished in the presence of a catalytic amount of trifluoromethanesulfonic acid. This catalyst, conventionally known as triflic acid, has been discovered to provide surprising and unexpected improvements in the preparation of the compositions of the present invention.

It has been found that substitution with various groups on the polystyrene units is possible, thereby producing thermoplastic elastomeric block copolymers which have glass transition temperatures of above 100° C. and in many cases above at least 120° C. The amount of substitution on the polystyrene end units ranges from as little as fifteen percent (15%) to as much as ninety five percent (95%). A preferred range is from about thirty (30%) to about sixty five (65%) percent substitution. These copolymers have increased high temperature strength.

DETAILED DESCRIPTION OF THE PREFERRED EMBODIMENT

Acylation of polymers was first described by Kenyon and Waugh for the acylation of polystyrene, in the *Journal of Polymer Science*, Vol 32, pgs. 83–88, in 1958. That work is not directly applicable to SEBS, however, because of concern for compatibility between the end segments and the mid segment. Similarly, the molecular weight is a factor which must be considered. A certain molecular weight range at constant composition is necessary to achieve useful elastomeric properties. A minimum molecular weight of the polymer block is needed in order to assure phase separation and provide elastomeric recovery in the copolymer. However, if the molecular weight of the block is too high, the increased viscosity of the polymer melt may hinder domain formation.

While it is desirable to increase the Tg of the end units in order to have an improvement in the strength of the block copolymer, a mere change in the end units does not bring about this effect. For example, if the polystyrene segments in an SBS copolymer are replaced by poly(4-tert-butylstyrene) segments of an equivalent molecular weight, the strength to break this modified block copolymer will be lower than for a conventional SBS copolymer of equivalent molecular weight even though poly(4-tert-butylstyrene) has a Tg of 134° C., compared to 100° C. for polystyrene.

It is believed that the loss in strength is due to the increased compatibility of the modified segment with the mid block segments. When polyisoprene is substituted for the mid block units, block copolymers having poly(4-tert-butylstyrene) end units have virtually no tensile strength at all because of the increased compatibility of the mid segments with the end segments. Accordingly, modification of the polystyrene end units by substitution of an end segment of this sort having a higher glass transition temperature leads to a less desirable product.

In accordance with the present invention, it has been discovered that the physical properties of thermoplastic elastomeric block copolymers may be improved by modification of the terminal polystyrene units with appropriate groups in an amount sufficient to raise the glass transition temperature of the copolymer. The modification comprises cycloaliphatic, or aromatic substitution. The proper amount of substitution on the polystyrene end units is sufficient to raise the glass transition temperature of the copolymer. Typically, the amount of substitution will range from about twenty (20%) to about ninety five (95%) percent, with a preferred range being about thirty (30%) to about sixty five (65%) percent. The glass transition temperature, Tg, is raised to above 100° C. and preferably to above about 120° C.

As will be described herein below, the reaction by which the styrene end units are modified is a Friedel-Crafts reaction under conditions which are relatively mild and which do not create unwanted side reactions in the mid block segment. While a number of catalysts may be employed, such as aluminum chloride and other conventional Friedel-Crafts catalysts, the preferred catalyst is trifluoromethanesulfonic acid, known herein and conventionally as triflic acid. Use of this catalyst substantially assists in avoiding degradation of the polystyrene segments as will be described.

As mentioned above, the modification reaction may be accomplished with any large group and may include cycloaliphatic aliphatic as well as aromatic groups. Preferred cycloaliphatic acylation groups are cyclopentoyl and cyclohexoyl groups. Aromatic acylation is also contemplated under the present invention. Substituted benzoyl, substituted and unsubstituted benzenesulfonyl groups and the various naphathoyl groups may be used. Of these, the latter is most preferred. Examples of these aromatic groups are para-nitrobenzoyl, para-methoxybenzoyl, and 2,4-dibromobenzoyl groups. Para-methoxy-, para-bromo-, and para-chlorobenzenesulfonyl groups may also be used. 1-naphthoyl and 2-naphthoyl groups have also been employed in the present invention as substituent groups on the polystyrene terminal end units and are preferred.

The following experiments were conducted to modify an SEBS polymer. Specifically, Kraton-G ® type 1652, manufactured by Shell Chemical Company, was employed. Kraton-G ® type 1652 is a block copolymer having thirty percent (30%) polystyrene and seventy percent (70%) poly(ethylene-co-butylene). Other reactions were carried out using Kraton-G ® type 1657 which is comprised of fourteen percent (14%) polystyrene and eighty six percent (86%) poly(ethylene-co-butylene). The modification procedure was carried out in carbon disulfide under a nitrogen atmosphere. After the SEBS polymer dissolved in the carbon disulfide, a modifying agent was added to the polymer solution under flow of nitrogen. The catalyst was then added to the polymer solution and reaction was started. The mixture was stirred for various times to obtain various amounts of modified groups. If a gel developed, it was taken up in tetrahydrofuran. The polymer itself was isolated by pouring the solution into methanol. The polymer was precipitated twice from tetrahydrofuran solution into methanol. The degree of modification was easily determined by proton magnetic resonance patterns of the products. When checked by elemental analysis, good agreement was obtained.

While aluminum chloride was an effective catalyst in some instances, one of the difficulties incurred in the use of this material is the quantity of aluminum chloride necessary for the reaction. The aluminum chloride does not function in catalytic quantities, since the amount of the aluminum chloride must be equal on a mole basis to the amount of modifying reactant employed. Other reactions were carried out using methylene chloride as the solvent because the aluminum chloride is soluble in methylene chloride.

The aluminum chloride remains associated with ketones which are formed from Friedel-Crafts reactions in a one to one complex. As the SEBS reacts, the polarity of the end segments increases due to the presence of the ketone groups which are associated with the aluminum chloride. The presence of the associated ketone group changes the solubility of the functionalized SEBS in the solvent.

With the alternative and preferred catalyst, trifluoromethanesulfonic acid, further described as triflic acid, degradation of the polystyrene segments can be avoided. Occasionally, when aluminum chloride catalysts are used, a decrease in molecular weight is observed. Triflic acid reacts with the modifying compound to form an anhydride with evolution of hydrochloric acid, for example, when the acid chloride is used. The anhydride then reacts with the phenyl groups on the polystyrene chain thereby again releasing triflic acid while forming a ketone. Triflic acid is also useful with other solvents which do not form complexes as aluminum does with nitrobenzene and the like.

Presented below in Table I are a number of experiments in which various modifying groups are substituted on the polystyrene end blocks of SEBS. Modification on the terminal polystyrene units raises the glass transition temperature of the thermoplastic elastomeric block copolymers as has been described herein.

TABLE I

| Substitution of SEBS End Blocks | | |
|---|---|---|
| Experiment No. | Group | Catalyst |
| 1 | 1-naphthoyl- | AlCl$_3$ |
| 2 | 2-naphthoyl- | AlCl$_3$ |
| 3 | 1-naphthoyl- | triflic acid |
| 4 | 2-naphthoyl- | triflic acid |
| 5 | cyclopentoyl- | triflic acid |
| 6 | cyclohexoyl- | triflic acid |
| 7 | p-nitrobenzoyl- | AlCl$_3$ |
| 8 | p-methoxybenzoyl- | triflic acid |
| 9 | 2,4-dibromobenzoyl- | triflic acid |
| 10 | p-methoxybenzenesulfonyl- | triflic acid |
| 11 | benzenesulfonyl- | AlCl$_3$ |
| 12 | p-chlorobenzenesulfonyl- | triflic acid |
| 13 | methoxbenzenesulfonyl- | triflic acid |

In order to evaluate the present invention, glass transition temperatures were measured. Tg was determined using a DuPont 951 Thermogravimetric Analyzer and a Polymer Laboratories 9122 differential mechanical thermoanalyzer. Tensile measurements were made using an Instron mechanical testor equipped with an environmental chamber. Microdumbbell test specimens were stamped from approximately 1 millimeter thick sheets that were prepared by compression molding at 165° C.

Table II lists Tg for samples of Kraton-G ® 1652 that had been naphthoylated. The amount of substitution on the polystyrene segments is shown.

TABLE II

| Increase in Tg | | | |
|---|---|---|---|
| Experiment No. | Group | % Subtraction | Tg Hard Block |
| 14 | -0- | -0- | 103 |
| 15 | 1-naphthoyl- | 15 | 117 |
| 16 | 1-naphthoyl- | 21 | 126 |
| 17 | 1-naphthoyl- | 30 | 136 |
| 18 | 1-naphthoyl- | 64 | 151 |
| 19 | 2-naphthoyl- | 28 | 123 |
| 20 | 2-naphthoyl- | 98 | 141 |

By increasing the glass transition temperature of thermoplastic elastomeric block copolymers, such as SEBS, improved high temperature properties are expected. Presented below in Table III are the results of experiments wherein tensile strength was measured for a number of samples over a range of temperatures. Particularly, three different examples of substitution on the polystyrene terminal end units of SEBS were made. As can be seen, the unsubstituted material has a tensile strength which drops off dramatically as the temperature reaches 60° C. and higher. In each case where the polystyrene units are substituted, significant strength retention is achieved at higher temperatures. In one case, the product of this invention is almost as strong at 125° C. as the untreated starting material is at 60° C. Thus, for the first time, these thermoplastic elastomeric block copolymers can be manufactured into products which would be relatively unaffected by sterilization temperatures.

TABLE III

| Percent Substitution in SEBS | Physical Properties Tensile Strength 1M.PA | | | | |
|---|---|---|---|---|---|
| | 25° C. | 60° C. | 90° C. | 105° C. | 125° C. |
| -0- | 41 | 4 | 1.7 | 0.4 | 0.3 |
| 30% 1-naphthoyl | 30 | 20 | 7.5 | 4.0 | 1.2 |
| 64% 1-naphthoyl | 26 | 14 | 8.4 | 10.4 | 3.5 |
| 28% 2-naphthoyl | 23 | 18 | 7.0 | 2.7 | 0.8 |

While particular embodiments of the present invention have been illustrated and described herein, it is not intended to limit the invention. Changes and modifications may be made therein within the scope of the following claims.

What is claimed is:

1. A thermoplastic elastomeric block copolymer comprising a polystyrene-poly(ethylene-co-butylene)-polystyrene block copolymer having cycloaliphatic or aromatic substitution selected from the group consisting of naphthoyl, cyclopentoyl, cyclohexoyl, p-nitrobenzoyl, p-methoxybenzoyl, 2,4-dibromobenzoyl, p-methoxybenzenesulfonyl, benzenesulfonyl, p-chlorobenzenesulfonyl, methoxy benzenesulfonyl, and mixtures thereof in an mount of from about 15% to about 95% of said polystyrene units to raise the glass transition temperature of said copolymer to above about 120° C.

2. The copolymer of claim 1 wherein said substitution is accomplished by reaction in the presence of a catalytic amount of triflic acid.

* * * * *